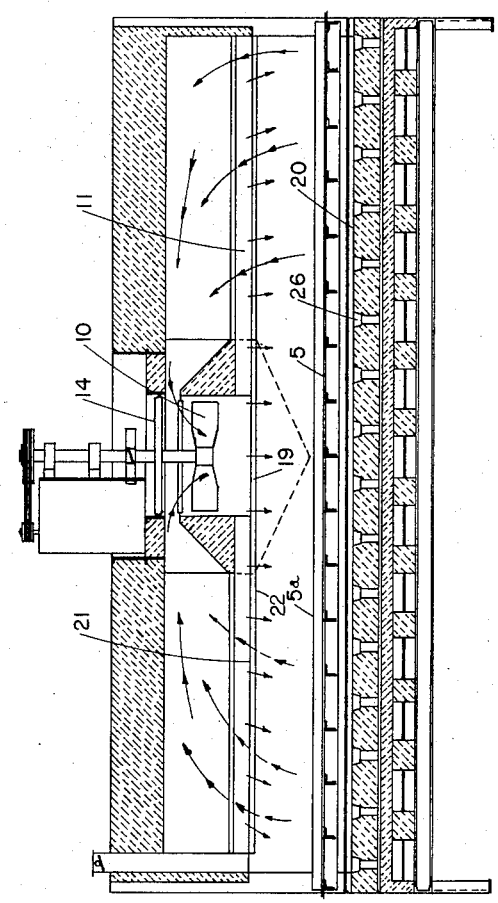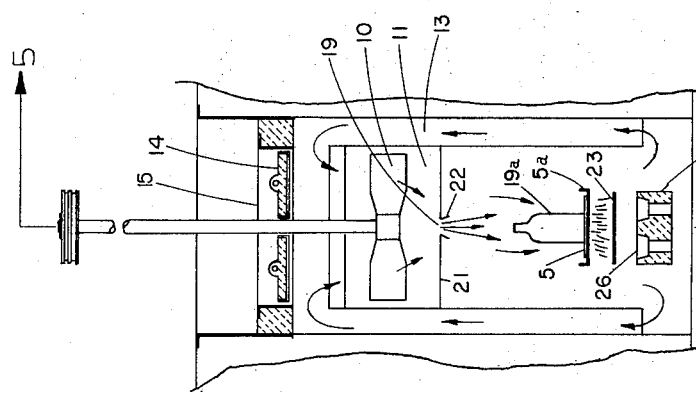
FIG. 5
FIG. 4

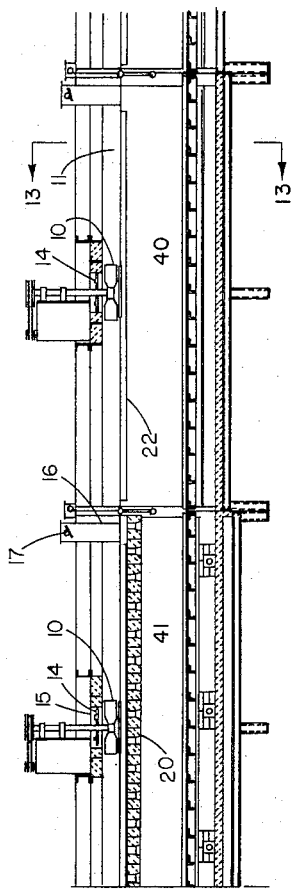
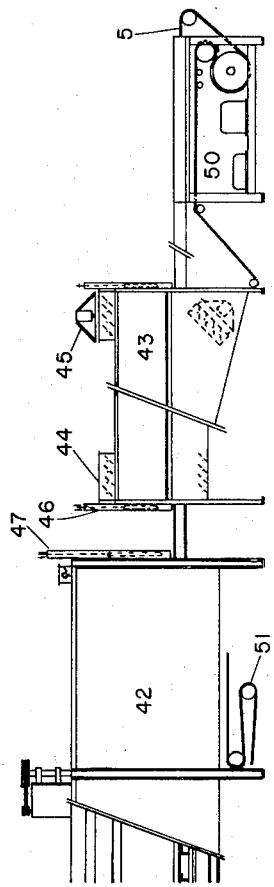

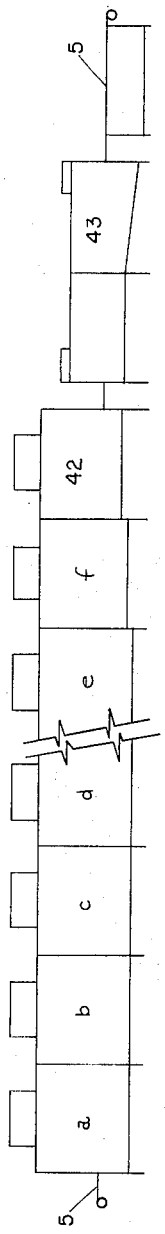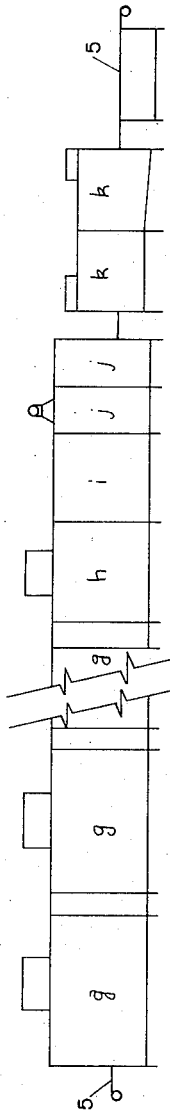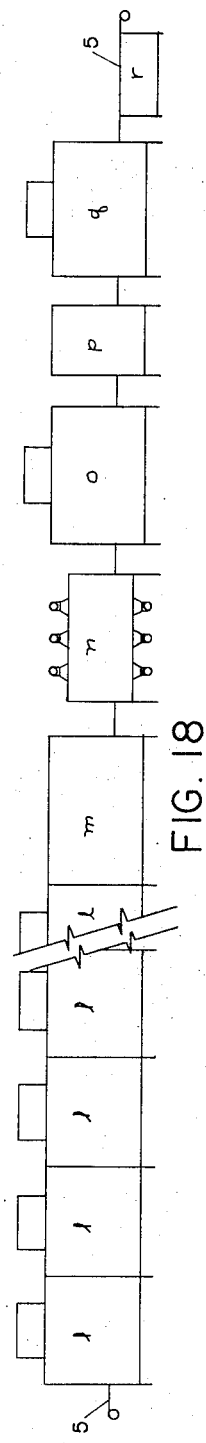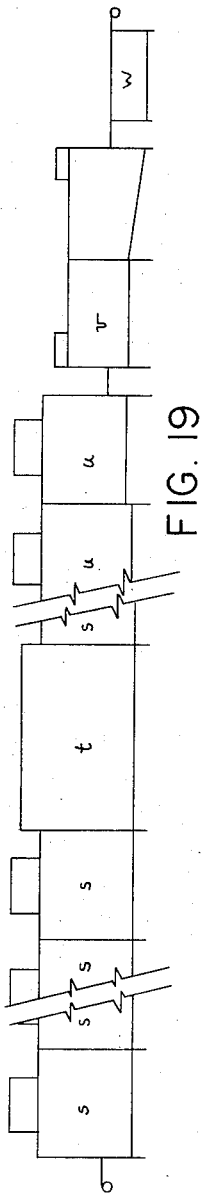

United States Patent Office 3,809,544
Patented May 7, 1974

3,809,544
METHOD AND APPARATUS FOR HEATING, ANNEALING, TEMPERING, DECORATING AND HANDLING GLASSWARE
Edward W. Bowman, Uniontown, Pa., Murial B. Bowman and Michael Edward Bowman, executors of said Edward Woodrow Bowman, deceased, assignors to E. W. Bowman, Incorporated, Uniontown, Pa.
Continuation-in-part of applications Ser. No. 197,302, Nov. 10, 1971, now Patent No. 3,754,885, Ser. No. 201,890, Nov. 24, 1971, now Patent No. 3,741,744, and Ser. No. 238,919, Mar. 28, 1972. This application Feb. 23, 1973, Ser. No. 335,010
Int. Cl. C03b 25/04
U.S. Cl. 65—119                 12 Claims

ABSTRACT OF THE DISCLOSURE

Apparatus for treating and handling bottles, containers, tumblers and other blown and pressed glassware, to heat, anneal, temper, decorate and coat the same in an efficient manner, in minimum time, and with apparatus that occupies minimum space in glass manufacturing plants.

DESCRIPTION OF PRIOR ART

In my copending applications serially numbered 197,302 filed Nov. 10, 1971 now Pat. No. 3,754,885, 201,890 filed Nov. 24, 1971 now Pat. No. 3,741,744, 238,919 filed Mar. 28, 1972, of which the present application is a continuation-in-part, there is disclosed automated zonal lehrs and ware handling equipment for annealing, spraying and transferring glassware which materially reduce the time consumed by equipment in conventional use. These applications also disclose a new method of heating the ware by directing the heating medium inside and outside the ware simultaneously to obtain uniform temperature throughout the treated ware in minimum time. The ware handling equipment disclosed therein eliminates abrasive contact of the ware with itself and the movable supports on which it rests in its passage from the forming machine to and through the annealing tunnel.

BACKGROUND OF THE INVENTION

The invention is in the field of treating machine formed glassware in which the forming and decorating machines have a capacity of producing the ware in excess of the capacity of the heating, cooling, transfer and handling equipment currently in use for passing the ware through the annealing lehrs and treating ovens.

SUMMARY OF THE INVENTION

The present invention utilizes novel combinations and arrangements of regulable heating means for specific treatment of glass during critical periods of annealing, tempering, decorating and coating, and controls the directive flow of the convectional treating medium.

By means of the present invention the time of heating the ware to uniform temperature is further reduced by supplemental heating means and by reversing the flow and recirculation of the heating medium.

Provision is made to subject the ware to uniformity of preheat prior to quenching for tempering the ware which is not commercially feasible in convective tunnel type preheat units currently in use.

BRIEF DESCRIPTION OF THE DRAWINGS

FIG. 4, a view like FIG. 3 showing dampered openings for admitting atmospheric air to the circulating heating medium;

FIG. 5, a vertical section of a heating unit taken along the line 5—5, FIG. 4;

FIGS. 6 and 6A, longitudinal sections of a heating and cooling unit forming an extension of the lehr of FIG. 1 at the break lines numbered 6 and 6a, FIG. 1;

FIG. 16, a diagrammatic view of an annealing lehr.
FIG. 17, a similar view of a continuous coating oven;
FIG. 18, a similar view of a tempering line; and
FIG. 19, a similar view of a decorating lehr.

In the drawings FIG. 1 is a portion of a zonal lehr in vertical section partially in elevation showing five heating zones (a), (b), (c), (d), and (e) and one cooling zone (f). The zonal sections are tunnel shape as shown in transverse sections, FIG. 2 being a cross section of zones (a) and (c) of FIG. 1, and FIG. 3, a cross section through zones (b) and (d) of FIG. 1. A perforated endless conveyor belt 5 passes through all of the zones from the front zone (a) to the cooling zone (f). Zones (a), (c) and (e) are heating zones utilizing convection heaters at the bottom, below the lehr belt and radiant heaters above the conveyor belt. Zones (b) and (d) applies convection heating above the conveyor and radiant heating below the conveyor.

Figure 1:
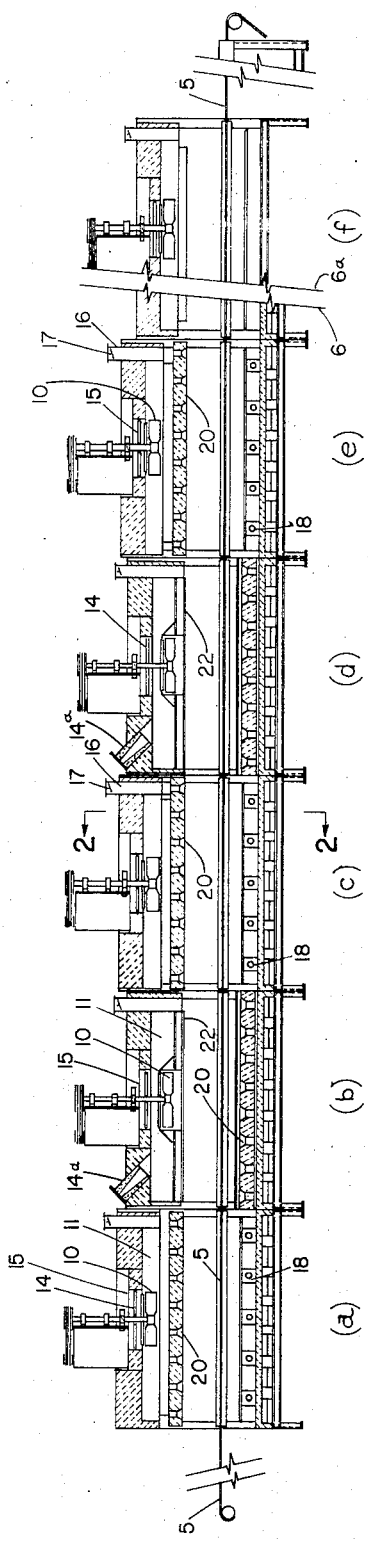
FIG. 1 is a vertical section taken longitudinally of a portion of an automated zonal lehr embodying the principles of this invention.

The convection heating of sections (b) and (d) is by jet firing disclosed in my copending application Ser. No. 197,302 filed Nov. 10, 1971, in which the heated gases such as air are forced under pressure through slot 19 into and around the bottle and radiant heat is applied below the conveyor belt 5. As shown by arrows, recirculation is upward through side ducts 13. The numeral 10 generally designates motor driven circulating fans disposed in chambers 11 communicating by ducts 12 and 13 with the bottom of the zonal chambers as shown in FIGS. 2 and 3, and burners 14a are provided in heating chambers 11 of zones (b) and (d).

Figure 2:
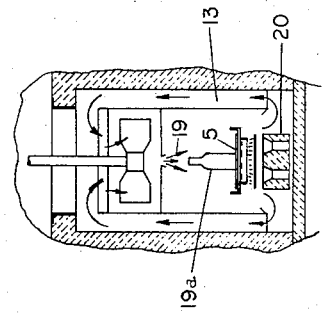
FIG. 2, a cross-sectional view of the lehr taken along the line 2—2, FIG. 1.
Figure 11:
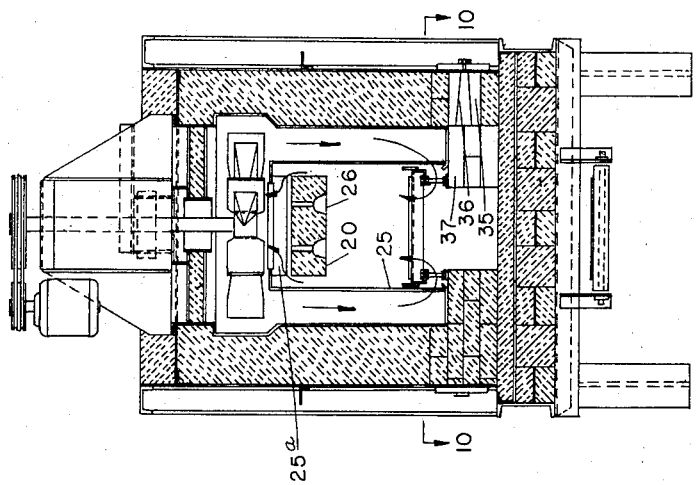
FIG. 11, a vertical section of a modified form of bottom burner and top radiant heaters.

As shown in FIG. 2 the side ducts 12 are open at the bottom and joined to a fan chamber 11 at the top. A cross duct 12a open at both ends is provided above radiant block 20 and communicates with fan chamber 11. Burner blocks 18 for convectional heating and radiants 20 for radiant heat subject bottles 19a to uniform temperature inside and out. The heat is circulated as indicated by arrows. In FIG. 11 side ducts 25 and cross ducts 25a utilize the convectional and radiant heat application as in FIG. 2 with the same direction of flow in the side ducts 12 of FIG. 2.

Figure 3:
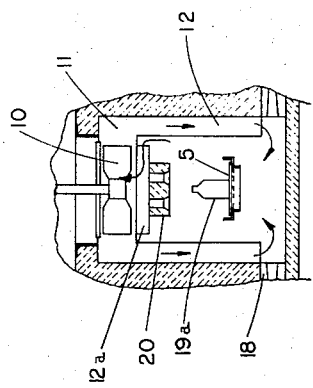
FIG. 3, a view similar to FIG. 2, taken through an adjacent heating zone.

In FIGS. 3 and 4 the radiant and convectional heating means are reversed as is the recirculation flow as shown by arrows.

Dampers 14 are provided in passages 15 connecting chambers 11 with the outside atmosphere to regulate the temperature of the heating medium circulating through the individual zones. By cutting off the heat supply to heating chamber 11 and drawing in air from the outside with dampers 14 open, cold air may be jetted to the inside and outside of the ware as it passes under the jet openings to uniformly cool the ware. Exhaust stacks 16 with dampers 17 are provided for each zone.

To assure adequate and uniform heating of the ware passing through the zones on conveyor belt 5, radiant heaters 20 are provided in alternate zones as shown; heaters 20 being provided above conveyor 5 in zones (a), (c) and (e), FIGS. 1 and 2 and below conveyor 5 in zones (b) and (d) in FIGS. 1 and 3.

The general construction is shown in FIGS. 1, 2 and 3 with fuel burner blocks 18 at the bottom of FIG. 2. FIG. 3 shows a slotted opening 19 for jetting the heating medium shown by arrows into and around the bottle 19a which is also heated from the bottom by radiant heaters 20. The construction of zones (b) and (d) is more clearly shown in FIGS. 4 and 5 of the drawings in which a sheet metal partition of stainless steel 21 has flared out turned flanges 22 to form the slot or opening 19 through which the heating medium is jetted down into and around the bottle 19a. The conveyor belt 5 is shown supported by angle bars 5a and a stainless steel partition 23 is disposed between the conveyor 5 and the radiant heaters 20 to prevent suspended particles from dropping onto the radiant heaters 20.

Figure 12:
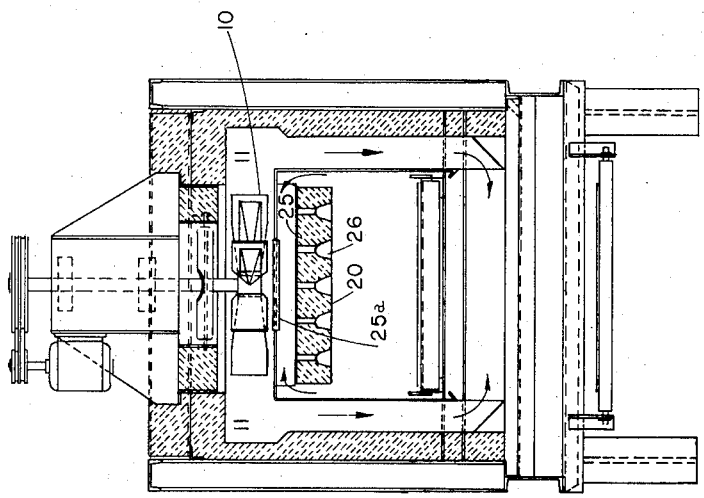
FIG. 12, a cross-sectional view of a radiant heated recirculating lehr.
Figure 15:
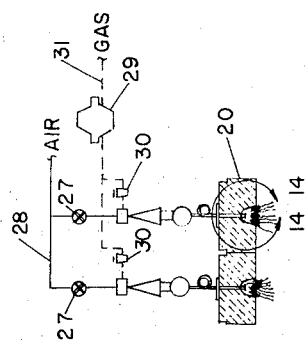
FIG. 15, a diagrammatic view of a pair of radiant heaters and connected air and gas supply lines with controls.
Figure 14:
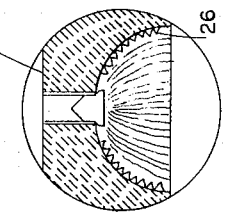
FIG. 14, a vertical section of a radiant heater.

The radiant heaters designated by numeral 20 and their connection to fuel and air manifolds and controls are shown in FIGS. 14 and 15 of the drawings. Blocks 20 of refractory material of which radiants are constructed may be arranged side by side in pairs or any number, five being shown in FIG. 12. The inner concave surface is formed of serrations 26 FIG. 14, which radiate a white heat that is controlled by valves 27 in the air manifold 28 and the gas regulator 29 and valves 30 in the gaseous fuel line 31.

Figure 8:
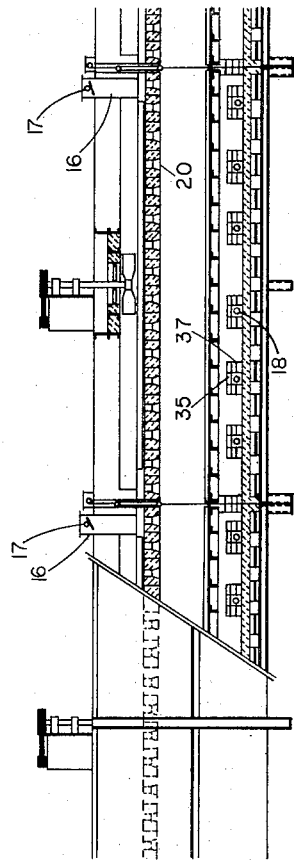
FIG. 8, a vertical section of the portion shown in elevation in FIG. 7.
Figure 10:
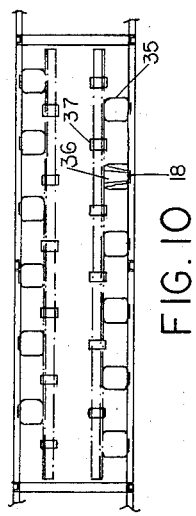
FIG. 10, a top plan view taken along the line 10—10, FIG. 11.
Figure 9:
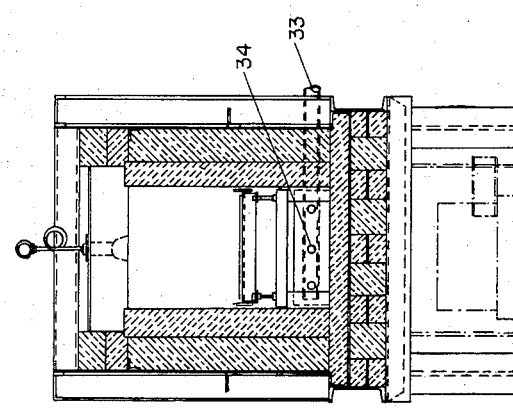
FIG. 9, a vertical cross-section of a bottom fuel fired lehr with a top radiant heater.
Figure 13:
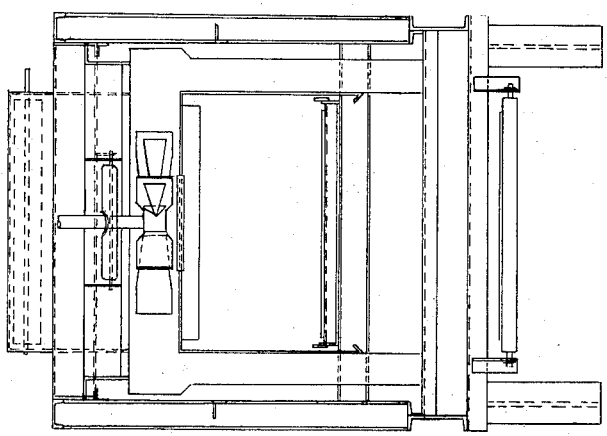
FIG. 13, a cross-sectional view taken through the cooling section along line 13—13, FIG. 6.

There are two other ways of heating the zonal heating chambers shown in FIGS. 8, 9 and 10.

FIG. 9 shows a gas pipe 33 with burner openings 34 and FIGS. 10 and 11 show burner blocks 35 with burner openings 36 at the side walls of the tunnel and partition piers 37 are spaced between burners to prevent horizontal stratification of the heating medium.

The heating and cooling function of the apparatus referred to in FIG. 1, 2, 3, 4, 5, 8, 9, 10, 12, 14 and 15 will now be described:

The general construction and annealing function of the zonal lehr is described in my Pats. Nos. 3,010,710 and 3,261,596 granted Nov. 28, 1961 and July 19, 1966, respectively. Each of the heating and/or cooling zones of the lehr has its own controls and operates independently of adjacent zones or chambers. The apparatus described herein assures more rapid and uniform heating of the ware for annealing, decorating, tempering and spraying. The handling equipment such as loading and transfer mechanism has been eliminated for clarity and is fully disclosed in my copending applications referred to above.

As shown in FIGS. 1, 2 and 3 the zonal chambers may be heated by radiant heaters 20 at the top and burners 14a gaseous fuel convection heaters 18 at the bottom as in zones (a), (c) and (e) or by radiant heaters 20 at the bottom and jet firing slots 19 at the top as in zones (b) and (d). And, as shown in FIG. 8, the radiant heating may be employed exclusively at the top in all heating sections of the lehr with gaseous heat being supplied in any suitable manner as by burners 35 and 18 or by fuel pipes 34, FIG. 9, or radiant heaters may be employed at both top and bottom or on two sides of the ware. Also, as shown in FIGS. 1, 2 and 3, circulation of the heating medium may be reversed in successive adjacent zones or in any heating zone throughout the length of the lehr as heating and cooling treatment may require.

Thus, in FIG. 2, the arrows indicate the heating medium is circulated downward through the ducts 12 and in FIG. 3 the arrows indicate a reverse flow, through ducts 13. Such reverse circulation assures uniformity of temperature of the ware passing through the heating tunnel.

The cooling zones of the lehr are shown in FIGS. 6 and 6A. FIG. 6 shows one portion of the cooling section 40 adjacent the last heating section 41 and FIG. 6A the rapid forced cooling section 42 and 43 at the discharge end of the lehr tunnel, both of which are fully described in my Pat. No. 3,371,430 granted Mar. 5, 1968. Section 43 is provided with air inlets 44 and blowers 45 and is separated from section 42 by gates 46 and 47 for regulating the flow of air to the lehr section 40 and the drift into section 41. FIG. 6A also shows the belt conveyor drive generally designated by reference numeral 50 and the belt take-up mechanism 51.

Having described the heating and cooling apparatus and their functional characteristics I will now describe some of the various uses of the invention in connection with FIGS. 16, 17, 18 and 19. FIG. 16 is a diagrammatic view of the zonal lehr referred to in FIGS. 1, 2, 3, 4, 5 and 6 of the drawings. This is employed for rapid heating and cooling of the ware passing through successive zones wherein it is heated inwardly by the radiants 20 of sections (a), (c) and (e) or the heating medium jetted through opening 19 in sections or zones (b) and (d). Also, the ware while passing through the lehr tunnel on the movable conveyor is heated at the bottom by the radiants 20 of section (b) and (d) or the bottom burners of sections (a), (c) and (e). The circulation downward or upward in the side flues 12 and 13, FIGS. 2 and 3 may be reversed in successive zones or some of the zones to grain the added advantage of rapidly heat treating the bottle or other ware from the inside and outside simultaneously and uniformly.

Figure 7:
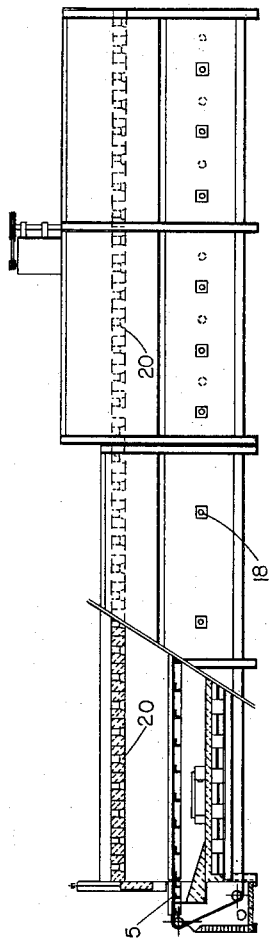
FIG. 7, a cross-sectional view partially in elevation of the front or charging end of the lehr extending from the break line to the first or preheat unit at the front of FIG. 1.

This is obviously beneficial when heavy face plates utilized in television tube manufacture are treated. If radiant heaters 20 are employed at the top along the full length of the heating zones as in FIGS. 7 and 8, heating of the inside of the ware or bottles by radiation is assured within a limited length of the heating tunnel. It is further evident that the radiants 20 may be simultaneously employed as bottom heaters to heat the base of the ware. The number of burners per zone would be determined by engineering calculations to match the heat input required for the load being run in terms of glass mass, and conveyor speed.

FIG. 17 is a diagrammatic view of a continuous coating oven utilizing the rapid heating and cooling zones of the construction described above. In FIG. 17 (g) are the heating units, (h) the cooling units, (i) the liquid coating spray units, (j) air blow unit and (k) the fast cool unit.

FIG. 18 diagrammatically illustrates a tempering line consisting of recirculating heating units (l), radiant heating unit (m), an air quench unit (n), a recirculating heating unit (o), a water spray quench (p), and a reheating unit (q). Glass ware to be tempered such as heat resistant oven ware or cooking ware is charged at the front end of the lehr and pass through heating units (l) and (m), air quench unit (n), recirculating heating unit (o), water spray quench (p), and the reheating unit (q), to the delivery table (r). Either the air quench or water quench may be used, or both. The supplemental heater radiants 20 at top or bottom and recirculation of the heated medium is opposite direction in some zonal sections conditions the ware to the proper temperature for quenching in minimum time.

The step of tempering glass ware is not new but the preheating of the ware prior to air quenching has not been satisfactory with convective tunnel heating in conventional use.

The use of automated zonal lehr sections with radiant heating or with radiant and convective heating with or without reverse circulation of the heating medium produces uniform heating of the ware either in single line passage or in rows transversely of the lehr tunnel. It is recognized that tempering table ware such as saucers or cups and cooking dishes for baking, etc. makes them resistant to thermal shock they are subject to in dishwashers or ovens. Also, by providing the optimum preheat for air quenching, soda lime glass, which is cheaper than the so-called heat resistant bora-silicate glass, may be used where shock resistant characteristics are important.

FIG. 19 is a diagrammatic view of a decorating lehr having radiant and recirculating heating units (s), a decorating zone (t), another heating unit (s), recirculating cool units (u), a fast cooling unit (v), and a receiving table (w). This unit rapidly heats the ware to uniform temperature in (s), passes it to decorating zone (t) thence through cool zone (u) and finally through the fast cooling unit (v). This rapid heating to bring the ware to decorating temperature and rapid cooling thereafter is necessary to decorate the ware at the speed of production of the forming machines in which it is produced which heretofore has not been accomplished on a commercial scale.

In the application of the coating material to the ware passing through the continuous oven of FIG. 17 the transfer and handling devices for lifting and exposing the ware to the coating spray is disclosed and described in my above mentioned copending applications serially numbered 201,890 filed Nov. 24, 1971 and 238,919 filed Mar. 28, 1972, respectively. The method of spraying and the materials used form no part of the present invention.

It will be evident from the foregoing description of the invention that by means of the simultaneous internal and external heating of the ware, particularly bottles, the flow of ware through the production line in the steps of forming, annealing, tempering, decorating and spray coating is greatly expedited and all equipment can be utilized to its full capacity. Bottle forming machines can be operated at high capacity without the bottles piling up and toppling over on the receiving and transfer conveyors which can be operated at greater speeds because of the reduced heating and cooling time in the lehr tunnel. It is apparent that the separate convective and radiant heating means and their controls and directive circulation of heating air and gases in successive zones of the treating tunnels reduces temperature differentials in the treated ware to a minimum both longitudinally and transversely of the tunnels. This is a critical factor in the heat treatment of glassware.

Various types and combinations of heating means, namely, convective, such as gaseous burners, radiant burners, such as the gas-fired radiant blocks, jet-fired, such as jetting hot gases under pressure into and around the outsider of the glass ware, can be used in the different zonal chambers of the layer where needed for best results, and the recirculation of the heating media and the selection of various combinations of the heating media and its reversible circulation meets every presently known requirement for the annealing and treating of glass ware.

Although several embodiments of the invention have been herein illustrated and described for use in the manufacture of glass ware it will be evident to those skilled in the art that various modifications may be made in the details of the construction such as in the arrangement of the burners and the recirculating means for firing and treating other refractory products such as pottery, brick, metal and plate glass without departing from the principles herein set forth.

I claim:

1. In an industrial heating furnace, coaxially aligned and communicating tunnel-shaped chambers in the form of separate, serially arranged heating zones, ware conveying means extending through said zones the full length thereof and carrying the ware to be treated, each heating zone having recirculating ducts at the sides thereof and a cross duct adjacent the top, a fan in each zone generally above said ware and in flow communication with said side ducts and said cross duct for convectively moving the contained atmosphere over the ware, heating means in each of said zones located respectively above and below said ware conveying means, and means for controlling the circulation of said fans in said heating zones so that the atmosphere is circulated over the ware from top to bottom in certain of said zones and from bottom to top in the remaining zones thereby to uniformly heat the ware as it passes serially through said zones.

2. In an industrial heating furnace, coaxially aligned and communicating tunnel-shaped chambers in the form of separate, serially arranged heating zones, ware conveying means extending through said zones the full length thereof and carrying the ware to be treated, each heating zone having recirculating ducts at the sides thereof and a cross duct adjacent the top, a fan in each zone generally above said ware and in flow communication with said side ducts and said cross duct for convectively moving the contained atmosphere over the ware, heating means in each of said zones located respectively above and below said ware conveying means, and means for controlling the circulation of said fans in said heating zones so that the atmosphere is circulated over the ware from top to bottom in alternate zones and from bottom to top in the remaining zones thereby to uniformly heat the ware as it passes serially through said zones.

3. The heating furnace of claim 2 wherein said heating means comprises convective heating means at the top and radiant heating means at the bottom of said heating zones in which the circulation of the contained atmosphere is from top to bottom in said zone, and wherein said heating means comprises convective heating means employed at the bottom and radiant heating means at the top of said zones wherein the circulation of the contained atmosphere is from the bottom to the top in said zone.

4. The heating furnace of claim 3 in which said convective heating means positioned at the top in certain of said heating zones consists of a blast of hot gas jetted under pressure through an opening formed in a transverse partition in said zone, said hot gas passing in and around said ware in a downward direction, with the bottom of said ware being heated by the radiant heaters disposed at the bottom of said heating zones.

5. The heating furnace of claim 2 further including air inlets and exhaust means for regulating the amounts of contained and ambient air in said heating zones, and damper means associated with said inlet and exhaust means.

6. The heating furnace of claim 2 wherein said heating means comprises radiant heaters positioned in both the top and bottom of said heating zones.

7. The heating furnace of claim 2 further including a cooling unit and a liquid coating spray unit located at the downstream end of said heating zones, with said heating zones serving to expeditiously preheat the ware prior to coating.

8. The heating furnace of claim 2 further including and air quench unit and a water spray quench unit located downstream of said heating zones for tempering said ware.

9. The heating furnace of claim 2 further including a decorating zone and a cooling zone located downstream of said heating zones for decorating said ware, said heating zones serving to rapidly heat said ware to bring the same to decorating temperature.

10. In an industrial heating furnace, coaxially aligned and communicating tunnel-shaped chambers in the form of separate, serially arranged heating zones, ware conveying means extending through said zones the full length thereof and carrying the ware to be treated, recirculating chambers at the sides of each heating zone, heating means in each zone above and below said ware conveying means, a fan in each heating zone for circulating and recirculating the contained atmosphere in said zone over said ware and through said recirculating chambers, and means for reversing the direction of flow of each of said fans for selectively reversing the direction of circulation of said contained atmosphere in each zone so that the atmosphere is circulated over the ware from top to bottom in alternate zones and from bottom to top in the remaining zones thereby to uniformly heat the ware as it passes serially through said zones.

11. In the method of treating glass ware and the like in a treating chamber having a movable ware conveyor passing therethrough and which chamber is divided into separate, serially arranged heating zones, the method comprising the steps of providing heating means above and below said ware in each of said heating zones, and circulating a convective heating medium over the ware from top to bottom in certain of said zones and from bottom to top in the remaining zones thereby to uniformly heat the ware as it passes serially through said zones.

12. In the method of treating glass ware and the like in a treating chamber having a movable ware conveyor passing therethrough and which chamber is divided into separate, serially arranged heating zones, the method comprising the steps of providing heating means above and below said ware in each of said heating zones, and circulating a convective heating medium over the ware from top to bottom in alternate zones and from bottom to top in the remaining zones thereby to uniformly heat the ware as it passes serially through said zones.

References Cited

UNITED STATES PATENTS

| 2,982,052 | 5/1961 | Lawson | 65—350 X |
| 1,657,797 | 1/1928 | Henry et al. | 65—350 X |

ARTHUR D. KELLOGG, Primary Examiner

U.S. Cl. X.R.

65—350, 351